United States Patent [19]

Davenport

[11] Patent Number: 4,623,453
[45] Date of Patent: Nov. 18, 1986

[54] FILTER PRESS AND SEPARATOR MECHANISM

[75] Inventor: James H. Davenport, Stoke-on-Trent, England

[73] Assignee: Eurotechnik (U. K.) Limited, England

[21] Appl. No.: 629,840

[22] PCT Filed: Nov. 1, 1983

[86] PCT No.: PCT/GB83/00281
§ 371 Date: Jun. 28, 1984
§ 102(e) Date: Jun. 28, 1984

[87] PCT Pub. No.: WO84/01725
PCT Pub. Date: May 10, 1984

[30] Foreign Application Priority Data

Nov. 1, 1982 [GB] United Kingdom ............... 8231212

[51] Int. Cl.⁴ ............................................. B01D 25/15
[52] U.S. Cl. .................................... 210/143; 100/198; 210/225; 210/230; 210/236
[58] Field of Search ................. 210/224–231, 210/236, 143, 323.1, 324; 100/198

[56] References Cited

U.S. PATENT DOCUMENTS 4,197,199  4/1980  Gribbin ........................ 210/230
4,461,705  7/1984  Gehrmann .................... 210/225

FOREIGN PATENT DOCUMENTS 1812901   8/1968   Fed. Rep. of Germany.
2627579  12/1977   Fed. Rep. of Germany.
1124320   6/1956   France.
 844208   8/1960   United Kingdom.
1074643   7/1967   United Kingdom.
2040716   9/1980   United Kingdom.
2042916  10/1980   United Kingdom.
2047109  11/1980   United Kingdom.
1587474   4/1981   United Kingdom.

Primary Examiner—Richard V. Fisher
Assistant Examiner—W. Gary Jones
Attorney, Agent, or Firm—Darby & Darby

[57] ABSTRACT

Automatic plate separation in filter presses is effected by a carriage (6) which is reciprocated to and fro adjacent a stack of plates (1). The carriage (6) has means for engaging the first and second plates in the stack and for urging them apart so that as the carriage is retracted to remove the first plate (1a) from the stack, the second plate (1d) is urged against the stack to ensure that the plates are moved one at a time.

9 Claims, 6 Drawing Figures

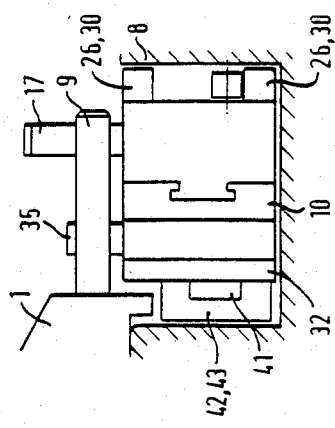
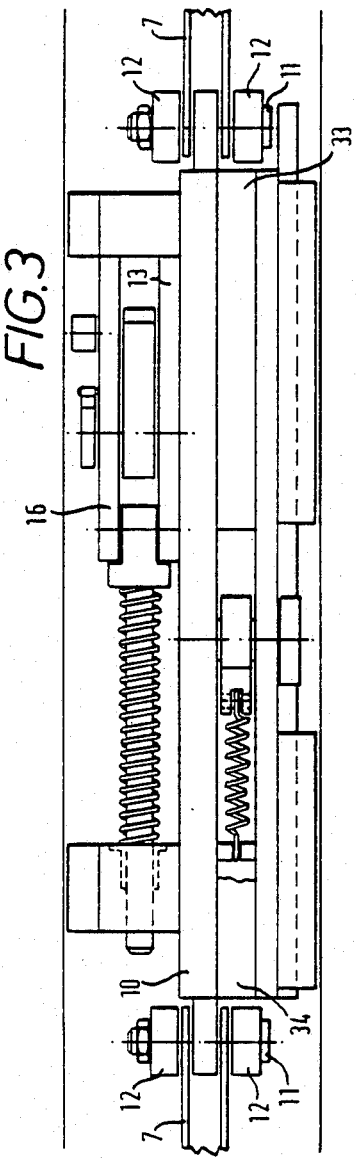
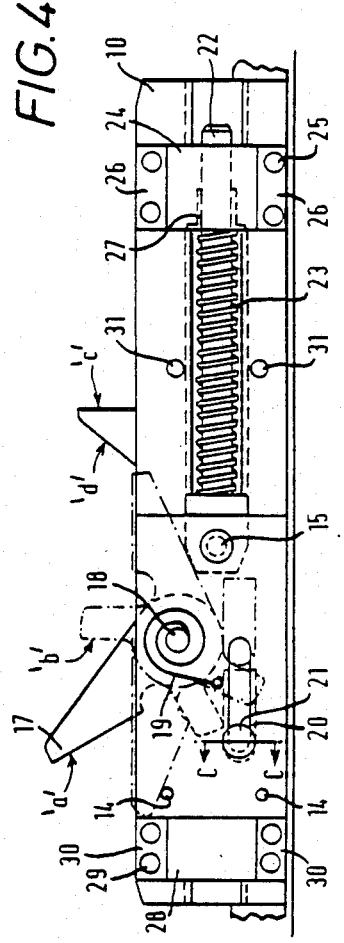
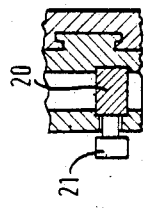

FILTER PRESS AND SEPARATOR MECHANISM

This invention relates to filter presses, and particularly to such presses having plte separator mechanisms, and to modification kits for conversion of existing filter presses.

Filter presses are well known and widely used pieces of equipment. A popular type consists of a set of filter plates which are arranged in a horizontal stack, i.e. with each plate in a generally vertical plane, and which are held pressed together while liquid to be filtered is introduced into the centre of the stack. Solids from the liquid build-up on the filter plates and eventually filtration has to be stopped to enable the filter cake which has built up on the plates to be removed. This can be a time consuming process.

British Patent Specifications Nos. 844,208, 1,074,643 and 2,040,716 describe and illustrate filter presses. Reference should be had to these specifications for a general description of operation.

In order to save time and labour, mechanisms have been developed for pulling apart the stack of filter plates, plate by plate working from one end, in order to remove the filter cake. British Patent Specification No. 2,042,916A describes and claims such a mechanism. While the mechanism there described assists in operating a filter press, it is not without its disadvantages. In particular, there is no means of guaranteeably removing just one plate at a time from the stack. While often it is only the first plate that is removed from the stack each time the mechanism is engaged with the stack, variations in the plate-to-plate adherence mean that sometimes when using the device described in Specification No. 2,042,916 more than one plate is pulled away from the end of the stack and manual separation of the generally two or three plates so pulled away is then necessary, which takes time. In addition, there is an increasing tendency for the use of lightweight plates in filter presses, and if attempts are made to disassemble a stack of these mechanically, damage to some of them sometimes occurs if they are stuck too well together; the retractor mechanisms simply put too much strain on the plate. This can also occur with the mechanism described in British Specification No. 1,587,474.

British Patent Specification No. 2,047,109 describes a filter press with a plate separation system including a pair of cam dogs which engage between lugs on the first and second plates and pries them apart. This system is better than those described in the specifications noted above, but tends to be inflexible in use and not easily matched to varying operational conditions.

We have now found that the efficiency of plate separation, using an interengaging cam pair system, can be materially improved by mounting both the cams on a common carriage which can be moved to engage the cams between first and second members in the stack respectively and which cams act to separate the plates using a known separating force prior to the first member being pulled away by one of the cams, and by enabling the separating force to be easily adjusted.

Thus, according to a first feature of the invention there is provided a filter press including a set of press plates mounted for movement along a track, the track being longer than the set of press plates, and including a plate separator mechanism and means for reciprocating the mechanism repeatedly to separate a single press plate from the set and move it along the track, wherein the mechanism includes a carriage mounted for reciprocation along the track, a pair of members mounted on the carriage and each adapted to engage a press plate, the members being biasable towards a spaced apart position in which two press plates so engaged are separate from one another, and the members being movable towards one another to enable them each to engage one press plate of a pair of non-separate adjacent press plates, and the carriage including a spring biasing the members apart.

Preferably, the spring biasing may be varied; varying the force pof the spring biasing provides a convenient way of varying the plate parting force effective during the separation of a stack of plates. Variation may be effected by mounting on the carriage a tension or compression spring arranged between a mounting block adjustably fixed to the carriage and a component supporting or constituting one of the engagement members.

Conveniently the engagement members are projections or cams which are arranged to engage over lateral projections on the plates.

In use, the carriage is reciprocated to and fro along the track and each time it comes to the end of the stack it moves forward until the two members are engaged on the first and second plates. In order for this to happen, members have been moved together and the carriage can be driven no further due to engagement of one of them with the second plate. The carriage may then be automatically reversed and, as that happens, the force acting against the spring bias is removed, and the spring bias then pushes the first two plates apart. As the carriage is moved back further, the first plate is carried with it, the second plate being left on the stack to constitute the first plate on the stack next time the carriage approaches.

Once all of the stack has been separated and the filter cake removed, it is necessary to track the carriage back past all of the plates, for which purpose it is convenient to include locking means, preferably automatic, which lock the plate engagement members in a folded away position where they do not engage the plates, so enabling the carriage to go past the stack of plates.

Conveniently the engagement members are engagement dogs both rotatably mounted on the carriage, one being mounted on a spring-loaded member movable relative to the other in the direction of movement of the carriage.

The present invention may be applied to various types of existing filter press, as well as used in the manufacture of various types of new filter press. In particular, it may be used in connection with filter presses having a set of plates supported on two parallel rails constituting a track by horizontally extending central arms, and filter presses in which a series of filter plates are suspended from a monorail.

The present invention also includes kits of parts including one or more carriages equipped as above with which an existing filter press may be modified to constitute a filter press in accordance with the present invention.

The invention is illustrated by way of example with reference to a specific embodiment and this is illustrated in the accompanying drawings, in which:

FIG. 3 is a plan vie of the carriage shown in FIG. 2.

FIG. 4 is a view of the carriage shown in FIG. 2 from the same side as it is viewed in FIG. 1.

FIG. 5 is a diagrammatic section through the track on which the carriage sits showing parts of the carriage and showing parts of a filter plate, and FIG. 6 is a section taken along the lines C—C indicated in FIG. 4.

Figure 1:
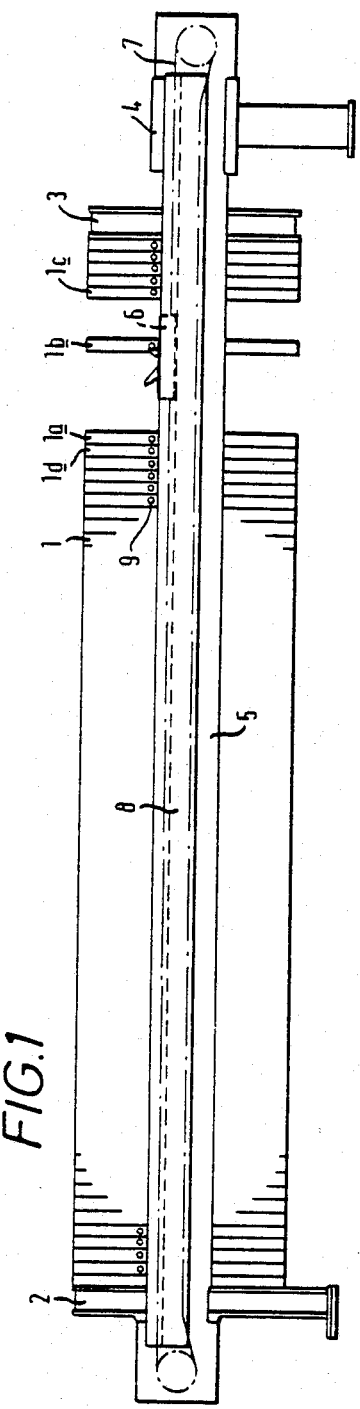
FIG. 1 is a diagrammatic side view of a filter press in accordance with the invention.
Figure 2:
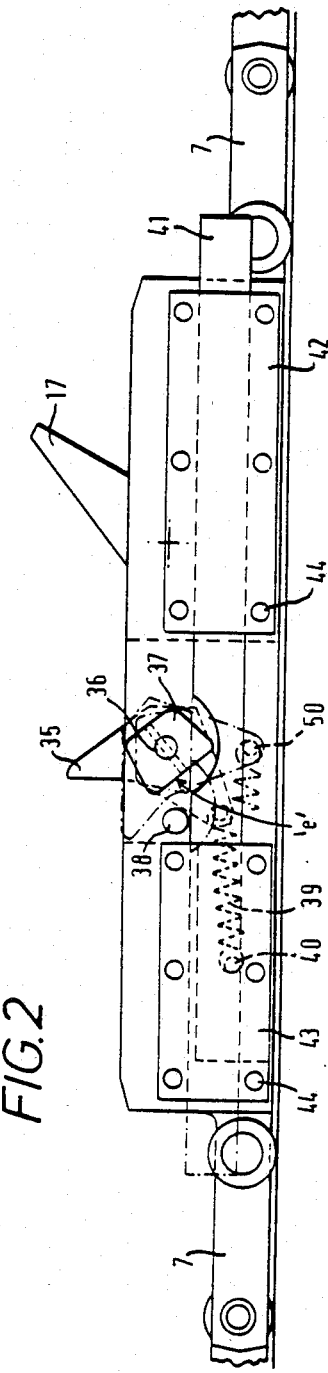
FIG. 2 is a side view on an enlarged scale of a carriage forming part of the press of FIG. 1 and viewed from the other side of the press than FIG. 1.

Referring to the drawings and specifically initially to FIG. 1 thereof, the filter press consists of a set of filter plates 1 arranged to be supported on side bars 5 by means of handles or arms on the side of each plate. The side bars 5 are mounted between a feed head 2 at one end of the stack and a cross head 4 at the other end. Shown adjacent to cross head 4 is a moving head 3 which is also supported on the side bars and which can be moved towards fixed head 2 to hold the stack of plates 1 together.

When such a stack has been used for filtration, filter cake is present on each plate. The moving head 3 is moved to the right-hand end position as shown in FIG. 1 and it is then necessary to separate the plates in the stack one by one to remove the filter cake.

In accordance with the present invention this is effected by a pair of carriages 6 which are reciprocated along a track 8 in bar 5 on each side of the press by means of a chain drive 7.

Referring now to FIGS. 2 to 6, the specific construction of each carriage 6 is shown in more detail. The carriage 6 consists of a base member 10 to each end of which is attached part of the chain drive 7 by means of a pin 11 which also carries rollers which roll on the bottom of track 8.

One side of base member 10 has a longitudinal T-slot, see FIG. 5, in which is slidably mounted a plate 13 by means of a T-shaped longitudinal rib thereon. Plate 13 bears via spacers a second plate 16 and between plate 13 and plate 16 there is mounted a stop cam 17, rotatable about a horizontal shaft 18 (see FIG. 4). The assembly of plates 13 and 16 carries mounted on a spacer pin 15 a bar 22 which extends away from plates 13 and 16 and passes through a hole in a member 24 fixed to base 10. The hole in member 24 is provided with a guide bush 27 to guide pin 22. Between the member 24 and the assembly of plates 13 and 16 is a compression spring 23 located about pin 22. Also fixedly mounted on base 10 are two stops 31 which limit the travel of plate 13 to the left as shown in FIG. 3.

Cam 17 is mounted for rotation about shaft 18 set between plates 16 and 13, and is biased by a helical spring 19 to the position shown in FIG. 4. In this position a short piece of cam engages on a catch 20 slidably mounted in plate 16.

The assembly of plates 13 and 16 is prevented from moving too far to the right as shown in FIG. 3 by a stop 28 mounted on base 10. Stop 28 and member 24 are both provided with projecting guides 30 and 26 respectively which act to centre the carriage in the track 8, as evident from FIG. 5.

On the other side of base 10 are two plates 33 and 34 and bridging them a further plate 32. Mounted on a shaft 36 between plates 32 and base 10 is a second cam 35, having a shape as shown and the base of which is spring biased by a spring 39 set between pins 40 and 50 to the position shown in full lines and dashed lines in FIG. 2. In this position, one face of cam 35 rests against a fixed stop 38.

The shaft 36 projects through plate 32 and carries a generally trapezoidal plate 37 fixed thereon. This plate 37 cooperates with a bar 41 which is mounted slidably against plate 32 by two housings 42 and 43 each of which is fixed to plate 32 by pins 44. The centre of bar 41 has an arcuate cut-out in its upper edge clearly visible on FIG. 2. Normally, the arcuate cut out is positioned where shown in FIG. 2 so that cam 35 can rotate about shaft 36. However, the cam can be fixed in the position shown in dash-dot lines in FIG. 2 by moving bar 41 longitudinally so that its upper edge comes to rest against the face of plate 37 marked 'e' on FIG. 2.

As noted above, carriage 6 may be reciprocated along the track 8 by means of chain drive 7 which may be driven suitably, e.g. by a hydraulic motor. The plate separation is effected by the pair of carriages 6, which are driven together, in the following way. First, the carriage is moved to the left as shown in FIG. 1. The first thing which occurs is that cam 17 meets one of the projecting pins 9. This rotates cam 17 around its axle as the carriage is advanced until the back of the cam comes to a full stop when it abuts the mounting of pin 22 on pin 15. At this stage, the normally non-protruding portion of cam 17 has emerged from the general outline of carriage 6 and the position is as shown in dash-dot lines in FIG. 4. The face of the then projecting portion of cam 17 marked 'b' in FIG. 4 then comes to engage the pin 9 of the second plate in the stack, denoted 1d in FIG. 1. That engagement causes plate 13 to slide along base 10 as the carriage 6 continues to advance with compression of spring 23. Towards the end of the travel of plate 13, i.e. as its leading edge nears stops 31, cam 35 passes underneath pin 9 of the first plate in the stack (1a in FIG. 1) rotating about its axis as it does so, with the face denoted 'd' in FIG. 4 being in contact with pin 9, and then springs upright again under the influence of spring 30.

At this stage, it is becoming increasingly difficult to drive carriage 6 forward and this is detected by the drive to chain drives 7 and the direction of movement of the chain drives is automatically reversed. As this happens, and carriage 6 starts to move to the right as shown in FIG. 1, the pins 9 on plates 1a and 1d are pushed apart by means of cams 17 and 35 acting on those two faces, those two cams being biased apart under the spring bias from spring 23. This spring force is normally adequate to separate the first two plates in the stack, plate 1d being left behind on the stack and plate 1a being then moved away as carriage 6 moves away to join the stack of plates from which filter cake has been removed, which are now lying against the moving head 3.

Should the plates not separate, this can automatically cause the drive to be stopped, e.g. by appropriate means (not illustrated) which detect that the right-hand end of the carriage as shown in FIG. 4 is being moved but that plates 16 and 13 are not moving relative to base 10. Alternatively, the condition of two plates stuck together may be visually detected by the operator and the machine stopped to enable their manual careful separation. Naturally, if the first and second plates in the stack are stuck firmly together but the second and third are not, then the pair of plates will be retracted by the carriage and simply moved to and fro until they either separate or someone stops the press and separates them.

Assuming correct separation has taken place, the plate which was first on the stack is now deposited against the stack adjacent the moving head 3 (after, of course, the filter cake has been removed).

When such deposition occurs, carriage 6 can no longer be driven to the right due to the engagement of cam 35 against the pin 9 of the last deposited plate and this causes the motor automatically to reverse again.

This process continues automatically until all of the plates in the stack have been removed to the right. At this stage fixed head 2 is exposed and as the carriage finally approaches the feed head 2 it engages a short pin 9 projecting laterally from the feed head 2 but not so far that cam 17 is engaged. Only cam 35 is engaged by this short pin, which pushes the face of cam 35 marked 'd' in FIG. 4 downwards so that the cam comes to lie in the position shown in dash-dot lines in FIG. 2. As this happens, stop members located on the side of feed head 2 engage bar 41 and catch 21. As the carriage continued to advance, bar 41 slides so locking cam 35 in its non-projecting position and catch 21 engages with its portion 20 the downwardly projecting shorter piece of cam 17, and moves that cam anti-clockwise as seen in FIG. 4 until no part of cam 17 projects above the top of the carriage. The assembly of pins 20 and 21 is held to the right of its position shown in FIG. 4 by spring 19 acting via cam 17. Thus both cams 35 and 17 are held out of the way and the carriage can now be moved back towards the right pasing underneath all of the pins 9 without difficulty. Once past moving head 3, appropraite projections into track 8 engage pin 21 and bar 41 and return them to their previous positions thus freeing cams 35 and 17. The mechanism is then switched off and the press is ready for a fresh filtering operation.

It should be observed that the magnitude of the separating force can be adjusted easily to match the type of plate being used and the type of material being filtered. Some adjustment is possible by moving members 24 and 28 relative to fixed stops 31, members 24 and 28 being appropriately configured for this purpose. Alternatively, it is straightforward to change spring 23 to a different power spring.

I claim:

1. A filter press comprising a set of press plates mounted for movement along a track, the track being longer than the set of press plates, and including a plate separator mechanism and means for reciprocating the mechanism repeatedly to separate a single press plate from the set and move it along the track, said mechanism including a rigid carriage mounted for reciprocation along the track; a pair of engagement members mounted separately and independently on the carriage and each capable of engaging a press plate to cause or prevent movement thereof, the engagement members being biasable towards a spaced apart position in which two press plates so engaged are separated from one another, and the engagement members being movable towards one another to enable each of them to engage a respective press plate of a pair of non-separate adjacent press plates, and the carriage including spring means biasing the engagement members apart said engagement members including engagement dogs both rotatably mounted on the carriage, one being mounted on a spring-loaded member laterally movable relative to the other in the direction of movement of the carriage,.

2. A filter press according to claim 1 wherein means are provided to vary the spring force biasing the engagement members apart.

3. A filter press according to claim 2 wherein there is mounted on the carriage a tension or compression spring arranged between a mounting block adjustably fixed to the carriage and a component supporting or constituting one of the engagement members.

4. A filter press according to any one of claims 1 to 3 wherein the press plates have lateral projections and the engagement members include projections capable of engaging the projections on the press plates.

5. A filter press according to claim 4 wherein the carriage includes means for locking the engagement members in a position in which they cannot engage the press plates.

6. A filter press according to claim 4 wherein the track includes two parallel rails, the press plates are mounted for movement between the rails and supported by lateral projections resting on the rails, and the press includes two separator carriages, one mounted for sliding movement along each rail and capable of engaging the lateral projections of the press plates to separate adjacent plates and to move a separated plate along the track.

7. A filter press according to claim 4 wherein the carriage is adapted to be driven to and fro along the track by a motor driven chain drive, there being a clutch between a drive motor and the chain drive and means to reverse the direction of movement of the carriage on the occurrence of clutch slippage.

8. A filter press according to claim 4 wherein the carriage is driven by a hydraulic motor having a limiting drive torque, and means are provided to detect when the limiting torque is reached and to reverse the motor in response thereto.

9. A filter press according to claim 1 wherein the carriage includes latch means enabling both engagement members to be held in a position in which the dogs do not project from the carriage and cannot engage the press plates.

* * * * *